Patented Aug. 14, 1945

2,382,207

UNITED STATES PATENT OFFICE 2,382,207

FURFURAL STABILIZER

Rock L. Comstock and Howard F. Reeves, Jr., Weeks, La., assignors to Bay Chemical Company, Inc., New Orleans, La., a corporation of Louisiana No Drawing. Application May 31, 1940, Serial No. 338,274

8 Claims. (Cl. 260—347)

This invention relates to stabilization of furfural.

Furfural is an organic liquid that normally is clear or colorless. It is used in modern technology as a solvent or a distributing agent, and also as a base for certain synthetic resins. To form resinous plastics furfural readily condenses with various reagents into larger molecular aggregates. But the tendency of furfural to resinify persists to an undesirable degree even without application of particular reagents. Furfural becomes altered spontaneously even in storage to produce gummy derivatives. These derivatives are dark in color. They darken the furfural in which they are formed and even when present in considerable dilution impart a brownish discoloration to the otherwise colorless furfural.

It is difficult to prevent this chemical alteration of furfural to dark gummy products because the nature of this change is not known with certainty. The change has been supposed to be due to oxidation. It is known that furfural is an organic compound of a heterocyclic system and that its structure is that of an aromatic-like, five-membered ring containing an oxygen atom in the ring. The carbon atoms attached to the oxygen are attached to other carbon atoms by double bonds; that is, furfural in structure is an unsaturated ring. Furfural contains the aldehyde group, in which also is an unsaturated bond. The accepted chemical structure of furfural is:

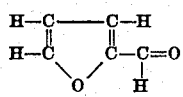

It is evident that furfural is susceptible to oxidation because unsaturated bonds tend to oxidize. In the past, agents for addition to furfural have been primarily to offset the tendency to oxidation. Thus the phenolic compounds well known as reducing agents have been used, such for example as pyrogallol, hydroquinone or catechol. Usually substances proposed have been such as respond to accelerated oxidation tests.

However, experience underlying this invention indicates that darkening of furfural during storage is not primarily an oxidation phenomenon. At least the critical condition or means of control is not primarily a matter of avoiding oxidation by means that would respond to accelerated oxidation tests.

An object of this invention is to stabilize furfural against alteration during storage. A further purpose is to maintain the clarity or colorless nature of furfural even in the presence of air. A particular object is to prevent formation of dark, gummy derivatives in furfural.

This invention accomplishes stabilization of furfural by incorporating certain compounds having the characteristics of weak bases. Particularly useful in thus stabilizing furfural under this invention are certain derivatives of organic amines. This invention comprises further a practical means of stabilizing furfural by adding compounds that react to produce required stabilizing agent in the furfural.

In preferred practice of this invention, furfuramid is added to furfural to stabilize the furfural against darkening or production of gummy derivatives during storage. Furfuramid is soluble in furfural. Amounts of furfuramid varying from 0.1 to 0.01% have proved to be effective to inhibit undesirable chemical deterioration of furfural. Furfuramid may be added as such, but effective stabilization results on forming furfuramid in situ by addition of ammonia to furfural. Whatever the mechanism, ammonia thus added becomes an adequate inhibitor against deterioration. The amount of ammonia may vary from .01 to 0.1% of the furfural.

Certain other compounds of the nature of derivatives of organic amines, preferably soluble in furfural, likewise are effective stabilizers against furfural deterioration. For example diphenylamine or benzidine are suitable inhibitors. All of these amines are non-phenolic in character. In addition, sodium hydrosulfite is an effective stabilizing agent for furfural. These protecting agents may be applied in concentration of about 0.01 to 0.1% of the furfural.

The examples now to be presented describe the efficacy of these particular protecting agents. The agents were added to furfural as described in the examples, and samples of the mixture were placed in closed test tubes and then inspected after standing for nine months. In the tests one sample of furfural is designated as QO which was obtained from the Quaker Oats Company and presumably carefully prepared from oat hulls. Other samples of furfural were prepared from rice straw and other samples prepared from bagasse. The samples marked "QO technical," "QO purified," "Bagasse—first distillation," and "Bagasse—second distillation" were untreated after receipt for tests. All other samples were made up from furfural distilled under vacuum of 29 inches, then agitated with concentrated alkaline salt solution to neutralize acids and washed with water before adding the stabilizing agents. These agents were added as solids except that sodium hydrosulfite was added as a 10% aqueous solution. This provides sufficient water to hold the hydrosulfite in solution. Where the tests designate furfuramid, either that compound was added directly or else ammonia was added to the furfural.

|  | Color | Consistency |
|---|---|---|
| In diffused light: |  |  |
| QO—technical grade | Black | Liquid. |
| QO—purified | do | Thick liquid. |
| QO—plus .1% furfuramid | Clear dark red | Thin liquid. |
| QO—plus .1% benzidine | do | Do. |
| QO—plus .1% diphenylamine | Iodine color | Do. |
| In complete darkness: |  |  |
| QO—technical | Badly carbonized | Liquid. |
| QO—purified | do | Nearly solid. |
| Furfural from rice straw: |  |  |
| Plus .1% furfuramid | Clear dark red | Thin liquid. |
| Plus .02% furfuramid | Clear, lighter amber | Do. |
| Plus .1% diphenylamine | Blackish iodine | Do. |
| Plus .02% diphenylamine | Greenish black | Do. |
| Plus .01% diphenylamine | do | Do. |
| Furfural from bagasse: |  |  |
| 1st distillation—untreated | Iodine color | Slightly carbonized. |
| 2nd distillation—untreated | do | Somewhat thinner. |
| Plus .1% furfuramid | Clear dark red | Thin liquid. |
| Plus .02% furfuramid | Dark amber | Do. |
| Plus .01% furfuramid | Lighter amber | Do. |
| Plus .1% sodium hydrosulfite | Light amber | Thin liquid with drops of water present. |
| Plus .02% sodium hydrosulfite | Reddish amber | Thin liquid, water almost absent. |
| Plus .01% sodium hydrosulfite | Dark red amber | Thin liquid, practically no water visible. |
| Plus .1% diphenylamine | Green black | Thin liquid. |
| Plus .02% diphenylamine | do | Do. |
| Plus .01% diphenylamine | do | Do. |

Protection is indicated by absence of a deposit in the liquid or of any dark colored compound in sufficient quantity or in condition to cloud the furfural. It is evident that fufuramid consistently excels in protection of furfural.

While in accordance with the patent statutes we have set forth the principles of this invention and have illustrated a preferred practice thereof by specific example, it will now be apparent to those skilled in the art that modifications may be made within the scope of the appended claims.

What we claim is:

1. A process of stabilizing normally unstable furfural comprising adding to the furfural a modicum of organic amide to substantially inhibit deterioration.

2. A process of stabilizing normally unstable furfural comprising incorporating in the furfural a modicum of furfuramid to substantially inhibit deterioration.

3. A process of stabilizing furfural comprising incorporating therein a modicum of organic amide.

4. A process of stabilizing furfural comprising incorporating therein a modicum of organic amide soluble in the furfural.

5. A process of stabilizing furfural comprising incorporating therein approximately 0.01% to 0.1% of furfuramid.

6. A stabilized furfural comprising normally unstable furfural containing a modicum of furfuramid to substantially inhibit the deterioration of the furfural.

7. A stabilized furfural comprising normally unstable furfural containing approximately 0.01% to 0.1% of furfuramid.

8. A process of stabilizing normally unstable furfural comprising adding to the furfural a modicum of furfuramid to substantially inhibit deterioration.

ROCK L. COMSTOCK.
HOWARD F. REEVES, Jr.